United States Patent [19]

Verduijn

[11] Patent Number: 5,460,796
[45] Date of Patent: Oct. 24, 1995

[54] PROCESS FOR PRODUCING SUBSTANTIALLY BINDER-FREE ZEOLITE

[75] Inventor: Johannes P. Verduijn, Leefdaal, Belgium

[73] Assignee: Exxon Chemical Patents Inc., Wilmington, Del.

[21] Appl. No.: 335,222

[22] Filed: Nov. 7, 1994

Related U.S. Application Data

[63] Continuation of Ser. No. 90,157, filed PCT/EP92/00144, Jan. 23, 1992, abandoned.

[30] Foreign Application Priority Data

Jan. 23, 1991 [GB] United Kingdom .................. 9101456

[51] Int. Cl.⁶ .......................... C01B 39/02; C01B 39/36
[52] U.S. Cl. ................ 423/700; 423/716; 423/DIG. 21; 423/DIG. 22; 423/DIG.26; 423/DIG. 27; 423/DIG. 33; 423/DIG. 35; 423/DIG. 36; 423/DIG. 38
[58] Field of Search .................... 423/700, 709, 423/710, 712, 716, DIG. 21, DIG. 22, DIG. 26, DIG. 27, DIG. 33, DIG. 35, DIG. 36, DIG. 38; 502/60, 64, 70, 71, 77

[56] References Cited

U.S. PATENT DOCUMENTS

| | | | |
|---|---|---|---|
| 3,356,450 | 12/1967 | Heinze | 423/716 |
| 3,394,989 | 7/1968 | Drost | 423/712 |
| 3,650,687 | 3/1972 | McDaniel et al. | 502/68 |
| 3,906,076 | 9/1975 | Goytisolo et al. | 423/710 |
| 4,091,007 | 5/1978 | Dwyer et al. | 556/173 |
| 4,381,255 | 4/1983 | Nozemack et al. | 502/68 |
| 4,381,256 | 4/1983 | Hildebrandt | 502/68 |
| 4,424,144 | 1/1984 | Pryor et al. | 502/68 |
| 4,522,705 | 6/1985 | Chu et al. | 208/120 |
| 4,582,815 | 4/1986 | Bowes | 502/64 |
| 4,824,815 | 4/1989 | Kugler | 502/64 |
| 4,861,571 | 8/1989 | Harada et al. | 423/709 |
| 4,977,120 | 12/1990 | Sakurada et al. | 502/64 |
| 5,011,667 | 4/1991 | Kuznicki et al. | 423/700 X |
| 5,026,531 | 6/1991 | Tannous et al. | 423/712 |
| 5,098,894 | 3/1992 | Sakurada et al. | 502/66 |
| 5,132,260 | 7/1992 | Plee | 502/64 |
| 5,145,659 | 9/1992 | McWilliams | 423/713 |

FOREIGN PATENT DOCUMENTS

| | | | |
|---|---|---|---|
| 0110650 | 6/1984 | European Pat. Off. | 423/709 |
| 0284206 | 9/1988 | European Pat. Off. | 502/64 |
| 0201264 | 2/1989 | European Pat. Off. | |
| 1048426 | 3/1986 | Japan | 502/64 |
| 1072621 | 4/1986 | Japan | 502/64 |
| 85/2012 | 3/1985 | South Africa | |

*Primary Examiner*—Mark L. Bell
*Assistant Examiner*—David Sample
*Attorney, Agent, or Firm*—Edward F. Sherer

[57] ABSTRACT

Silica-bound extruded zeolites may be converted into binder-free zeolite aggregates by aging the zeolite in an aqueous ionic solution which contains hydroxy ions such that the initial molar ratio of $OH^-:SiO_2$ is up to 1.2 and which causes the silica binder to be converted substantially to zeolite of the type initially bound. Such extrudates have excellent mechanical strength and show advantageous properties such as adsorption comparable with non-extruded zeolite powder.

36 Claims, 3 Drawing Sheets

1 CM = 1 MICRON

8 CM = 1 MICRON

1 CM = 1 MICRON

PROCESS FOR PRODUCING SUBSTANTIALLY BINDER-FREE ZEOLITE

This is a continuation of application Ser. No. 08/090,157, filed Jul. 23, 1993, now abandoned, which is based on PCT/EP92/00144, filed Jan. 23, 1992, which is based on GB 9101456.3, filed Jan. 23, 1991.

The present invention relates to a process for producing substantially binder-free zeolites, and the use of these zeolites in catalysis and in separation processes.

DESCRIPTION OF RELATED ART

Zeolites are complex crystalline aluminosilicates which form a network of $AlO_4$ and $SiO_4$ tetrahedra linked by shared oxygen atoms. The negativity of the tetrahedra is balanced by the inclusion of cations such as alkali or alkaline earth metal ions. In some zeolites non-metallic cations are present in the synthesis such as tetramethylammonium (TMA) or tetrapropylammonium (TPA). The interstitial spaces or channels formed by the crystalline network enable zeolites to be used as molecular sieves in separation processes. Zeolites ability to adsorb materials also enables them to be used in catalysis.

Synthetic zeolites are prepared by crystallization from a supersaturated synthesis mixture. The crystalline product may be dried and calcined to give a zeolite powder. Whilst the zeolite powder may have good adsorptive properties, its practical applications are severely limited since the powder has no significant mechanical strength.

Mechanical strength may be conferred on a zeolite by forming a zeolite aggregate for example a pill or extrudate. An extrudate may be formed e.g. by extruding the zeolite in the presence of a binder and drying and calcining the resulting extrudate. Known binders include e.g. clays, such as kaolin, attapulgite, or boehmite, or aluminas and/or silicas. Silica is a common binder for zeolite extrudates.

A bound zeolite aggregate has a much better mechanical strength than the zeolite powder. However, bound zeolite aggregate does not have such favourable adsorption properties as the zeolite powder. The binder is typically present in an amount of up to about 30 wt % and the presence of the binder dilutes the zeolites adsorptive properties. Moreover, if the bound zeolite extrudate is used in catalysis, unless the binder is completely inert it can interfere with the catalytic process.

The concept of a self-bound or binder-free zeolite has been discussed in e.g. U.S. Pat. No. 4,582,815 and GB 1092681. U.S. Pat. No. 4,582,815 describes binder-free ZSM-5 zeolite which was prepared by mulling, extrudating and drying a mixture of ZSM-5 zeolite powder, a hydrated silica and sodium hydroxide.

GB 1092681 describes a process in which molecular sieve granules which are bound with silicic acid are treated at 15 to 100° C. with an aqueous solution containing at least 0.4 mol of $Al_2O_3$ (as an alkali metal aluminate) and at least 1.5 mols of alkali metal hydroxide per mol of binding agent calculated as $SiO_2$.

EP-A-284206 describes a process for producing binder-free zeolite L particles in which silica-bound particles are reacted with an alkaline solution comprising a source of alumina to convert the silica binder to zeolite L. The described process is, however, limited to zeolite L. Moreover, to produce a strong binder-free zeolite, according to this publication it is necessary for alumina to be present in the solution and increasing the alumina content produces a stronger binder-free zeolite.

SUMMARY OF THE INVENTION

It has now been found that silica binder may be converted into a wide variety of zeolite crystal structures by aging the bound zeolite in an ionic solution and that the strength of the binder-free zeolite is not solely dependent on the alumina of content of the solution. The production of binder-free zeolite is possible, provided that the initial $OH-/SiO_2$ ratio in the aging mixture is within certain limits and provided that the ingredients of the aging solution are appropriate to produce a zeolite whose crystal structure matches that of the bound zeolite.

Figure 1A:
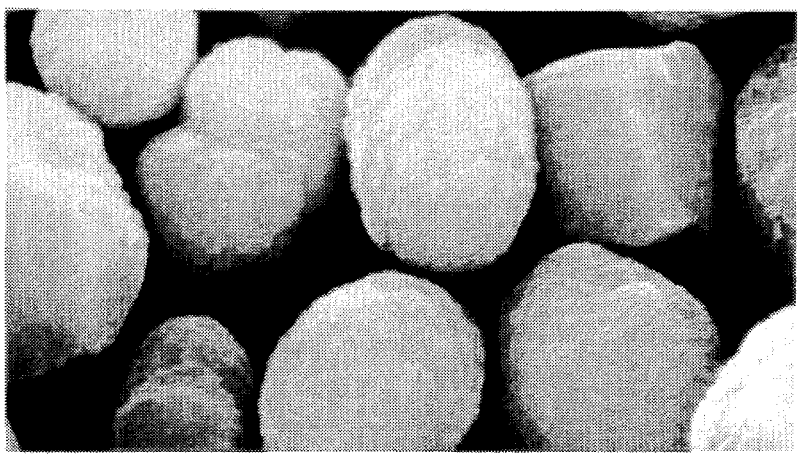
FIGS. 1A through 1C show SEM micrographs of the zeolite product of Example 1.

The applicants have now identified a process for producing certain types of binder-free zeolite, which process is simple to carry out and results in a binder-free zeolite which has good mechanical strength, but at the same time shows properties of e.g. adsorption which are comparable to that of the zeolite powder.

DETAILED DESCRIPTION OF THE INVENTION

The present invention provides a process for producing substantially binder-free zeolite which can be prepared from a synthesis mixture with a molar ratio of $OH-:SiO_2$ in the range of 0.1 to 1.2 preferably of type MFI, KFI, Y, Beta, Omega, Chabasite, T, Offretite, ZSM 22, ZSM 23, titanosilicates, ZSM 34 or ZSM 12 comprising aging at elevated temperature a silica-bound zeolite aggregate in an aqueous ionic solution which contains hydroxy ions such that the initial molar ratio of $OH-:SiO_2$ is up to 1.2, preferably from 0.1 to 1.2, and which causes the silica binder to be converted substantially to zeolite of the type initially bound.

The term "substantially binder-free" used herein refers to a plurality of individual zeolite crystallites held together without the use of a significant amount of non-zeolitic binder, i.e. the zeolite contains less than 10 wt % (based on the total weight) of non-zeolitic binder, preferably less than 5 wt %, more preferably less than 3 wt % of non-zeolitic binder.

The technique is applicable to a number of totally different types of zeolite e.g. MFI, KFI and Y, and it is therefore considered that the technique is applicable to any zeolite which can be prepared from a synthesis mixture in which $OH-:SiO_2$ ratio is from 0.1 to 1.2. Therefore, the process may be used to obtain binder-free zeolite from silica-bound aggregate of at least the following zeolite types: MFI, KFI, Y, Beta, Omega, Chabasite, T, Offretite, L, ZSM 22, ZSM 23, titanosilicates, ZSM 34 or ZSM 12.

The silica binder use in preparing the silica-bound zeolite aggregate may be commercially available silica provided that this contains no significant amount, and preferably no more than 2000 ppm, of alumina. It is not contemplated that alumina should be added in any other form in the formation of the silica bound zeolite aggregate.

Using the process, the silica-bound aggregate is aged in an appropriate aqueous solution at elevated temperature. The contents of the solution, and the temperature at which the aggregate is aged, should be selected to convert the amorphous silica binder into the form of zeolite which was initially bound by the silica or which is a crystallographic match for the initially bound zeolite. These parameters may be selected by the skilled person using the knowledge relating to the initially bound zeolite and guided by the following information relating to specific types of zeolite.

For example, a KFI-type zeolite may be aged in a solution containing a source of potassium aluminate together with a source of strontium; an MFI-type zeolite may be aged in a solution containing a source of tetrapropylammonium (TPA) and optionally a source of alumina and optionally a source of $Na^+$; a beta zeolite may be aged in a solution containing a source of alumina and a source of tetraethylammonium; an omega zeolite may be aged in a solution of tetramethylammonium and a source of $Na^+$ and offretite may be aged in a solution containing a source of alumina, a source of tetramethylammonium and a source of $K^+$. Suitable aqueous solutions for these and other zeolite types can be envisaged by the skilled person.

During the aging, the amorphous silica surrounding the matrix zeolite crystals is converted into zeolite crystals of the same type as the matrix zeolite. The newly-formed zeolite may be produced as crystals grown on and surrounding the initial matrix crystals, and may also be produced in the form of new intergrown crystals, which are generally much smaller than the matrix crystals e.g. of sub-micron size. The matrix crystals may grow to be joined together, or may become joined together by the smaller intergrown crystals which seem to act as a glue.

The zeolite aggregate, which is commonly an extrudate, used in the present process may be prepared in the usual way i.e. a zeolite synthesis mixture is prepared and aged to allow crystallization; the resulting product is washed, dried and optionally calcined to produce zeolite powder; the zeolite powder is mixed with a silica sol together with an extrusion aid to form a thick, smooth paste. The paste is then extruded to form silica-bound extrudate which is dried and calcined.

When carrying out the process of the present invention the zeolite extrudate is aged at elevated temperature. A suitable aging temperature may range from 95° to 200° C. depending on the type of zeolite. Zeolites such as zeolite Y may be aged at the lower end of this range e.g. 95° to 110° C. preferably 95 to 105° C. whereas zeolites such as KFI and MFI-type zeolites may be aged at higher temperatures such as 130° to 170° C., preferably 145° to 155° C., most preferably around 150° C.

The time during which the extrudate may be aged will depend on the zeolite being aged, but may be e.g. from 20 to 140 hours. Zeolites such as zeolite Y do not, in general, require long aging but this depends on the $OH^-$:$SiO_2$ ratio of the synthesis mixture, and times may be from 18 to 40 hours, preferably 18 to 28 hours. Zeolites such as KFI- and MFI- types tend to need longer aging times e.g. 60 to 140 hours. For KFI-types the time is preferably 110 to 130 hours, and more preferably about 120 hours. For MFI-types the time is preferably 70 to 80 hours. One skilled in the art would be capable of assessing, without undue experimentation, a suitable aging time for a particular bound zeolite in combination with an aging solution.

After aging it is usual to wash and dry the zeolite. If desired, the zeolite may then be calcined e.g. at a temperature of 450° to 550° C.

It is believed that binder-free zeolite may not be produced when there are no matrix (zeolite) crystals present in the extrudate being aged. An extrudate which is 100% silica may be partially or completely converted into a zeolite but it is believed that on aging the extrudate will fall apart. In an experiment relating to zeolite KL pure silica extrudate after aging in potassium aluminate solution resulted in a partially fallen-apart extrudate comprising amorphous unbroken extrudate and crumbled extrudate to which was adhered zeolite KL. It is believed that the presence of zeolite matrix crystals is necessary to act as a seed onto which new zeolite crystals are formed.

It is necessary for the aging solution to have a pH which is not too alkaline. This may be achieved using an initial molar ratio of $OH^-$:$SiO_2$ of 0.1 to 1.2. Generally ratios of 0.3 to 0.6 are used. If the ratio is too high (i.e. the solution has high alkalinity) the matrix crystals will tend to dissolve in the solution. The silica binder, instead of being converted into zeolite crystals on the matrix crystals, or forming intergrown crystals, dissolves out of the extrudate and crystallises outside the matrix, forming a layer of crystals surrounding the remaining matrix crystals. This weakens the extrudate. The more alkaline the aging solution the more the silica dissolves out of the extrudate.

The silica binder may be converted to zeolite crystals of the same type as the initially bound zeolite or may be converted to crystals which are a crystallographic match for the initially bound zeolite. The term "crystallographic match" refers to zeolites with the same structure but which may have different T atoms and/or a different $SiO_2$/T ratio. For example, the silica binder may be converted into zeolite crystals which have the same structure type as the initially bound zeolite but differ in the T-atom, e.g. alumino-silicate zeolite Y crystals may be joined together using gallo-silicate zeolite Y formed from silica binder. As another example, zeolites of type X and Y may be considered as having "matching" crystalline structures; the distinction between the two types of zeolite lies in their silica/alumina ratio. Thus if it is desired to make binder-free zeolite X and the particular aging solution required to give the necessary silica/alumina ratio to convert the binder to zeolite X would have too high a ratio of $OH^-$/$SiO_2$, then an aging solution may be used which has an $OH^-$/$SiO_2$ ratio within the specified limit (i.e. not more than 1.2) and which will convert the silica binder to zeolite Y.

To assist further in the understanding of the invention a more detailed description will be given with respect to preferred zeolites of type KFI and MFI.

KFI and MFI refer to the structure type of the zeolites using the nomenclature proposed by the International Zeolite Association. A KFI-type zeolite is typified by ZK5 zeolite which may be aluminosilicate of formula:

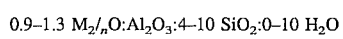
0.9–1.3 $M_{2/n}O$:$Al_2O_3$:4–10 $SiO_2$:0–10 $H_2O$ where M is a cation of valence n, typically an alkali metal.

Small amounts of an alkaline earth metal such as strontium may be added to the synthesis mixture of a ZK-5 zeolite, e.g. 0.1 moles Sr per 3.6–4 moles of metal M. The resulting zeolite contains small amounts of Sr. This Sr may be sufficient to trigger formation of ZK-5 during formation of the binder-free zeolite. If the amount of Sr is not sufficient, then an extra source of Sr, e.g. strontium nitrate, may be added to the extrudate when it is aged to form the binder-free zeolite. It is well within the scope of a skilled person to establish a suitable level of strontium to produce ZK-5 zeolite, referring e.g. to the teachings of British Patent Application No. 8709507.

MFI-type zeolite is a high-silica zeolite typified by ZSM-5 or silicalite. ZSM-5 has a typical formula:

$$Na_n\ Al_n\ Si_{(96-n)}\ O_{192}.16H_2O$$

where n is approximately 3.

The sodium ions in the MFI-type zeolite may be replaced by TPA.

The synthesis mixture for the binder-free zeolite of (a) KFI-or (b) MFI- type zeolite comprises an appropriate silica-bound zeolite extrudate, water and either (a) a source of potassium aluminate or (b) a TPA$^+$ species and optionally a source of aluminium and if appropriate an Na$^+$ or alkaline earth metal species.

In process (a) the silica-bound extrudate may be added to a potassium aluminate solution, produced from potassium hydroxide and aluminium hydroxide. The composition is then heated to preferably 145° to 155° C., most preferably about 150° C. It may be maintained at this temperature for 60 to 140 hours, preferably 110 to 130 hours and more preferably about 120 hours. The resulting product may then be washed and dried.

In process (b) a preferable process comprises mixing a solution containing sodium ions e.g. aqueous sodium hydroxide, with a solution containing TPA ions e.g. a TPA halide solution, such as TPA bromide. The silica-bound extrudate may then be added and the composition heated to preferably 145° to 155° C., most preferably about 150° C. The material is maintained at this temperature for 60 to 140 hours, preferably 70 to 80 hours. The resulting product may then be washed and dried. To remove the TPA+-species the product may be calcined after washing, preferably at a temperature of 450° to 550° C.

The binder-free extrudates of the present invention have mechanical strength which is at least comparable to and often stronger than that of silica-bound zeolite aggregate. For example typical crush strengths of the silica-bound and binder-free extrudates compare as follows:

| MFI | CRUSH STRENGTH |
|---|---|
| SiO$_2$ bound extrudate | 0.46 kgf/cm$^2$ |
| Binder free extrudate | 1.28 kgf/cm$^2$ |
| KFI | |
| SiO$_2$ bound extrudate | 0.75 kgf/cm$^2$ |
| Binder free extrudate | 1.12 kgf/cm$^2$ |

The binder-free extrudates have adsorption properties comparable with that of the zeolite powder. For example hexane adsorption of the binder-free KFI is at least 9 wt % at 30° C. and p/po=0.25, compared with an adsorption of about 6 wt % under the same conditions for the silica-bound zeolite aggregate.

The binder-free extrudates of the present invention may be used for a wide variety of purposes. They may be used as a support for a catalytic material. The extrudates may also be used in other catalytic processes associated with zeolites e.g. hydrocracking, isomerisation, hydrogenation, dehydrogenation, hydrofining and polymerisation. The following examples illustrate the invention:

EXAMPLE 1 (MFI TYPE ZEOLITE)

A. PREPARATION OF ZEOLITE ZSM-5:

20.4 kg of a synthesis mixture with a molar composition of:

0.45 Na$_2$O/0.9 TPA Br/0.125 Al$_2$O$_3$/10 SiO$_2$/146H$_2$O was aged at 150° C. for 5 days without stirring in a 25 liter stainless steel autoclave. The resulting product was washed with water to pH 10.2 and dried at 120° C. for about 16 hours. A portion of the product was calcined in air at 475° C. for 32 hours. Characteristics of the calcined product:

XRD: Pure ZSM-5.

SEM: –3 micron spherical crystallites.

TGA: Hexane adsorption at p/po=0.25 and T=30° C.:11.5 wt %.

Elemental: SiO2/Al2O3 ratio=80.

B. PREPARATION SILICA-BOUND PARTICLES

A portion of the calcined product of (A) above was formed into 2 mm extrudates with silica as follows:

| COMPONENTS USED FOR PREPARATION | QUANTITY (grams) |
|---|---|
| Zeolite ZSM-5 crystals (dried at 150° C. for 2 hours) | 200.00 |
| H$_2$O | 49.75 |
| SiO$_2$ gel (Aerosil 300)* | 18.82 |
| Silica sol (NALCOAG 1034A)* | 197.24 |
| Extrusion aid (hydroxypropyl methyl cellulose) | 1.07 |

*TRADE MARK

The above components were mixed in a food processor in the order shown. About 6 minutes after adding the extrusion aid a thick and smooth paste was obtained. The paste was extruded into 2 mm extrudates. The extrudates were dried overnight at 150° C. and then calcined at 510° C. for 6 hours in air.

Composition of calcined silica-bound extrudates:

ZSM-5: 69.96 wt %

SiO$_2$ binder: 30.04 wt %

C. CONVERSION TO BINDERLESS ZSM-5 PARTICLES

Preparation synthesis mixture:

| COMPONENTS USED FOR PREPARATION | QUANTITY (grams) |
|---|---|
| Solution A: | |
| NaOH pellets (98.3%) | 1.16 |
| H$_2$O | 24.63 |
| Additional rinse water | 10.02 |
| Solution B: | |
| Tetrapropylammoniumbromide | 8.00 |
| H$_2$O | 25.47 |
| Additional rinse water | 18.89 |

Solution A was poured together with the additional water into a 300 ml stainless steel autoclave.

Solution B was poured together With the additional water into the contents of the autoclave. The two solutions were mixed. Finally, 60.04 grams of the silica-bound ZSM-5 extrudates (pre-dried for 2 hours at 150° C.) were added to the synthesis mixture in the autoclave.

The composition of the mixture in the autoclave was:

0.48 Na$_2$O/1.00 TPA Br/10 SiO$_2$/147 H$_2$O (OH–:SiO$_2$ ratio –0.1)

The amount of ZSM-5 crystals in this mixture was 40.5 wt % based on the total weight of the mixture. In this mixture the silica is present as the binder in the extrudate. The autoclave was heated up to 150° C. and kept at this temperature for 71 hours. After this aging period the autoclave was opened and the product-extrudates were collected.

The product was washed in a Buechner funnel with 4250 ml of water in 11 portions, the pH of the last wash water was 10.2. The extrudates were dried for 3 hrs at 150° C. Weight of extrudates recovered after drying: 62.5 grams. It appeared that the product-extrudates were significantly harder than the starting silica-bound extrudates. The product-extrudates were calcined in air for 18 hours at 500° C. to remove the TPA+-species. Weight loss after calcination was 5.8 wt %.

The product extrudates were characterized by x-ray diffraction (XRD), scanning electron microscopy (SEM) and hexane adsorption, with the following results:

XRD: % crystallinity increase vs starting silicabound extrudates: 32% (height increase of peaks at d values between 3.02 and 2.96 A).

SEM: 10,000 times micrographs show that the −3 micron ZSM-5 crystallites of preparation (A) were intergrown and coated with newly formed submicron crystallites. There is no visible amorphous silica which is plainly visible in the micrographs of the starting-extrudates.

Hexane adsorption:

On crushed extrudate: 10.9 wt %

On extrudate: 10.6 wt%

EXAMPLE 2

| COMPONENTS USED FOR PREPARATION | QUANTITY (grams) |
|---|---|
| Tetrapropylammoniumhydroxide (20% in water) | 1181.84 |
| NaOH pellets (98.3%) | 8.95 |
| $SiO_2$ powder (AKZO SM-604)* | 270.00 |

*TRADE MARK

The NaOH pellets were dissolved in the TPAOH with stirring. The $SiO_2$ source was dissolved in the NaOH/TPAOH solution with stirring and heating to boiling. The clear solution was aged in a polypropylene vessel under reflux at 98° C. in an oilbath for 138 hours.

The product was washed, dried and calcined. XRD showed that the product had the pattern of silicalite-1.

SEM showed that the product consisted of −0.1 micron spherical crystallites.

B. PREPARATION SILICA-BOUND SILICALITE PARTICLES

A portion of the calcined product of (A) above was used to prepare silica-bound silicalite particles with a size between 500 and 850 microns, using the same procedure and ingredients to prepare the paste as in Example 1. In this case, however, the paste was not extruded, but dried at 120° C. and ground to a sieve fraction between 250 and 500 microns. This fraction was calcined at 510° C. in air for 9 hours to destroy the extrusion aid.

C. CONVERSION TO BINDERLESS SILICALITE PARTICLES

The same procedure and ingredients were used as in Example 1. The composition of the synthesis mixture was:

0.48 $Na_2O$/1.00 TPA Br/10 $SiO_2$/164 $H_2O$. (OH−:$SiO_2$ ratio −0.1)

The mixture was aged in a 300 ml stainless steel autoclave at 150° C. for 74.5 hours. The product was washed, dried and calcined for 16 hours at 510° C.

The binder-free particles were analyzed by XRD, SEM and hexane adsorption with the following results:

XRD: % crystallinity increase vs starting silicabound particles: 30% (height increase of peaks at d values between 3.02 and 2.96 A).

SEM: 80,000 times micrographs show that the −0.1 micron silicalite crystallites of preparation (A) of this example were recrystallized into a different shape and were somewhat larger in size (−0.2 micron). It also appeared that the 0.1 micron crystals were intergrown into a very dense packing; hardly any interstitial voids could be seen.

Hexane adsorption: 10.8 wt %.

EXAMPLE 3

A. PREPARATION OF ZEOLITE ZK-5

According to our Patent Application GB 8709507 a 3 kg batch of ZK-5 was prepared in a 25 liter autoclave. The composition of the synthesis mixture was:

1.95 $K_2O$/0.1 Sr/$Al_2O_3$/10 $SiO_2$/160 $H_2O$

The ZK-5 product was analyzed by XRD, SEM and hexane adsorption with the following results:

XRD crystallinity: 90% vs standard

SEM: 0.5–1 micron cube-shaped crystallites hexane adsorption: 10.5 wt % (p/po=0.25. T=30° C.).

B. PREPARATION SILICA-BOUND ZK-5 PARTICLES

A portion of the ZK-5 product of (A) above was formed into 2 mm extrudates as follows:

| COMPONENTS USED FOR PREPARATION | QUANTITY (grams) |
|---|---|
| $SiO_2$ sol (NALCOAG 1034A) | 98.65 |
| $Sr(NO_3)_2$ powder | 1.52 |
| $H_2O$ | 73.00 |
| $SiO_2$ gel (AKZO SM604) | 10.44 |
| ZK-5 | 101.42 |
| Extrusion aid (hydroxypropyl methyl cellulose) | 0.65 |

The above components were mixed in a food processor as follows:

The $Sr(NO_3)_2$ powder was dissolved in a portion of the water, the $Sr^{2+}$-containing solution was added to the Silica sol and mixed. The other components were added and mixed in the order shown above.

The resulting thick paste was extruded into 2 mm extrudates. The extrudates were dried overnight in a stove at 150° C. and subsequently calcined in air for 8 hours at 470° C. This calcination temperature was chosen to avoid decomposition of the strontium nitrate.

Composition of the calcined silica-bound ZK-5 extrudates in weight %:

ZK-5: 67.9

$SiO_2$ binder: 31.0

Sr $(NO_3)_2$: 1.1

C. CONVERSION TO BINDERLESS ZK-5 PARTICLES

Preparation synthesis mixture:

| COMPONENTS USED FOR PREPARATION | QUANTITY (grams) |
|---|---|
| KOH pellets (86.8%) | 2.9960 |
| $Al(OH)_3$ (98.6%) | 2.0178 |
| $H_2O$ | 10.09 |
| additional $H_2O$ | 10.04 |

-continued

| COMPONENTS USED FOR PREPARATION | QUANTITY (grams) |
|---|---|
| SiO$_2$-bound ZK-5 extrudates (predried at 150° C.) | 25.00 |

The potassium aluminate solution was poured into a 300 ml stainless steel autoclave together with the additional water. The strontium-containing silica-bound ZK-5 extrudates were then added. The extrudates were just covered by the liquor.

The composition of the synthesis mixture in the autoclave was:

1.80 K$_2$O/0.10 Sr/0.99 Al$_2$O$_3$/10 SiO$_2$/167 H$_2$O (OH–:SiO$_2$ ratio= 0.36)

The autoclave was heated up to 150° C. and kept at this temperature for 5 days. After this period the autoclave was opened and the product-extrudates were recovered. The product was washed in a Buechner funnel with 8 portions of 400 ml water, the pH of the last wash water was 9.8. The product was dried for 16 hours at 150° C. The weight of the recovered product was 26.8 gr. It appeared that the product-extrudates were significantly harder than the starting silica-bound extrudates. The product was characterized by XRD, SEM and hexane adsorption with the following results:

XRD: Pure ZK-5, crystallinity increase vs starting silica bound extrudates: 47%.

SEM: Micrographs show that the ZK-5 crystals are intergrown with newly formed ZK-5 crystals. There is no visible amorphous silica which is plainly visible on the micrograph of the silica-bound starting extrudates.

Hexane adsorption:
   ZK-5 powder of (A) above: 10.5 wt %
   Silica-bound ZK-5 extrudate: 6.3 wt %
   Binder-free ZK-5 extrudate: 10.3 wt % measurements were done on crushed extrudates.
   Conditions: p/po=0.25, T=30° C.

EXAMPLE 4

A. PREPARATION OF BINDER FREE ZEOLITE Y

Commercially available zeolite Y crystals were formulated into 2 mm silica bound extrudates. The silica bound extrudates contained 30 wt % amorphous silica as binder. The extrudates were calcined for 7½ hours in air at 525° C.

Preparation synthesis mixture for conversion to binder free form: Components used for preparation of the sodium aluminate solution.

| | QUANTITY IN GRAMS |
|---|---|
| NaOH Pellets (98.3%) | 5.86 |
| Al(OH)$_3$ powder (99.3%) | 2.77 |
| H$_2$O | 8.53 |
| Additional Rinse water | 47.50 |

The sodium aluminate solution was poured together with the additional water into a 300 ml stainless steel autoclave. Next 35.04 grams of the silica bound Y extrudates (predried at 150° C. for 2 hours) were added to the solution. The molar composition of the mixture in the autoclave was:

4.10 Na$_2$O/1.01 Al$_2$O$_3$/10 SiO$_2$/184 H$_2$O (OH–:SiO$_2$ratio=0.82)

The amount of Y crystals in this mixture was 35.2 wt % based on the total weight of the mixture. In this mixture the silica is present as the binder in the extrudate. The autoclave was heated up to 98° C. and kept at this temperature for 24 hours. After this period the autoclave was opened and the product-extrudates were collected.

The product was washed in a Buechner funnel with 5650 ml of water in 9 portions. The pH of the last wash water was 9.7. The extrudates were dried over a weekend at 150° C.

The product extrudates were characterised by XRD, SEM and hexane adsorption.

XRD: % crystallinity increase vs. Starting silica bound extrudates: 13%.

Hexane adsorption: 14.7 wt % on crushed extrudate.

Figure 1B:
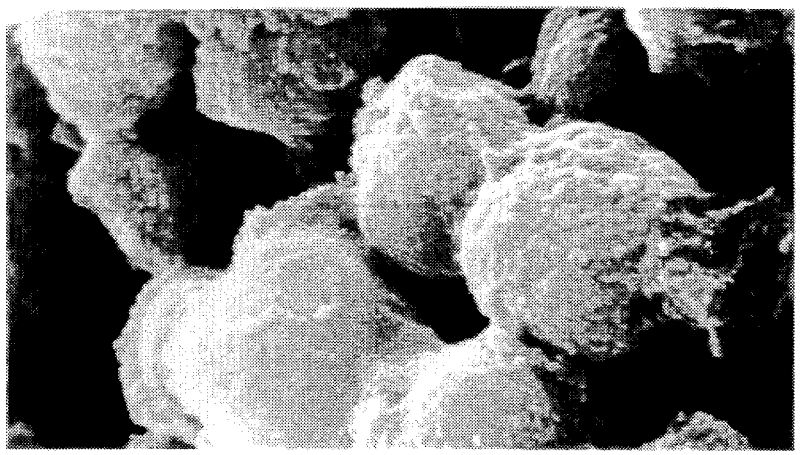
Figure 1C:
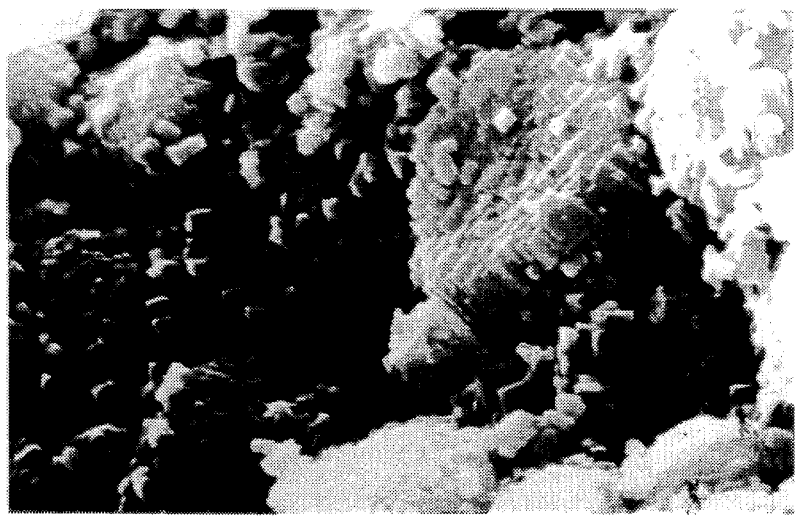

FIG. 1 shows three micrographs of ZSM-5 zeolite produced in Example 1. The magnification is 10,000 times so that 1 cm=1 micron. The top micrograph shows the ZSM-5 crystals of preparation A, the zeolite powder of crystals of approximately 3 microns. The second micrograph shows the silica-bound extrudate of preparation B. The crystals are coated with amorphous silica. The third micrograph shows the crystals of the binder-free extrudate of preparation C. The crystals are coated with and connected by newly formed crystals grown in between the crystals of approximately 3 microns size. Sub-micron coffin-type ZSM-5 crystals have also formed.

Figure 2A:
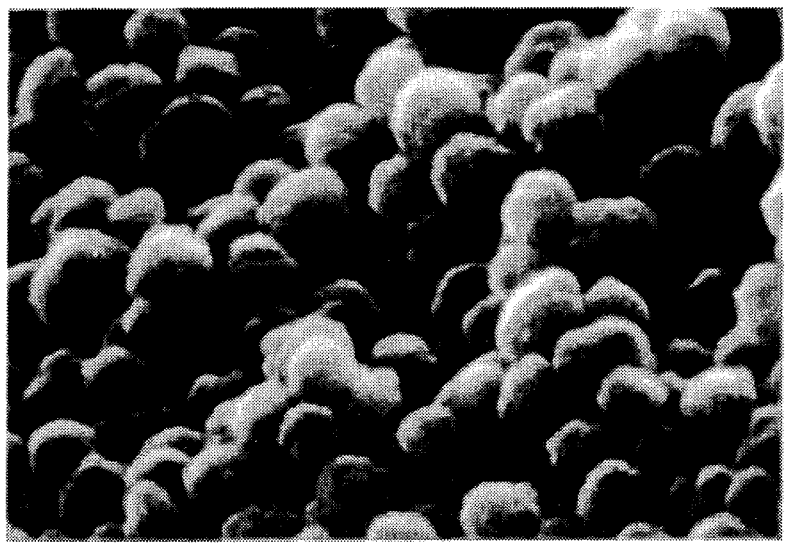
FIGS. 2A through 2C show SEM micrographs of the zeolite product of Example 2.
Figure 2B:
Figure 2C:

FIG. 2 shows three micrographs of silicalite produced in Example 2. The magnification is 80,000 times so that 8 cm=1 micron. The top micrograph shows the silicalite matrix crystals first prepared, with crystallite size of approximately 0.1 micron. The second micrograph is of the silica-bound silicalite, and the third micrograph is of the binder-free silicalite particles. These latter particles can be seen to have intergrown to form very dense packing.

Figure 3A:
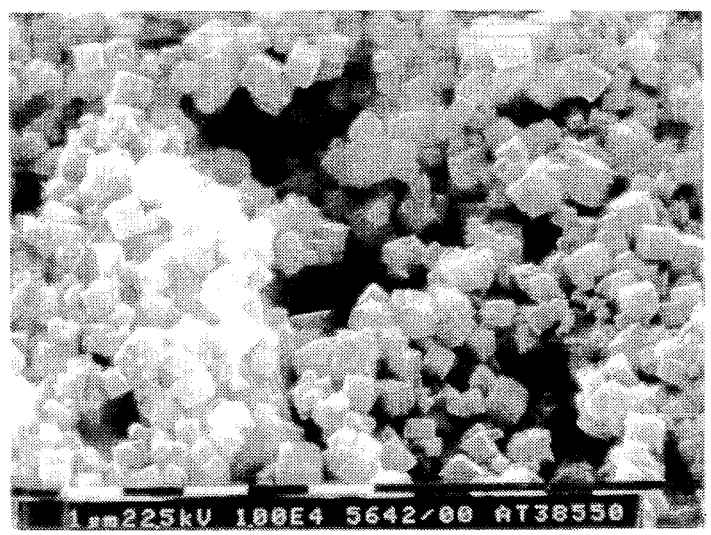
FIGS. 3A through 3C show SEM micrographs of the zeolite product of Example 3.
Figure 3B:
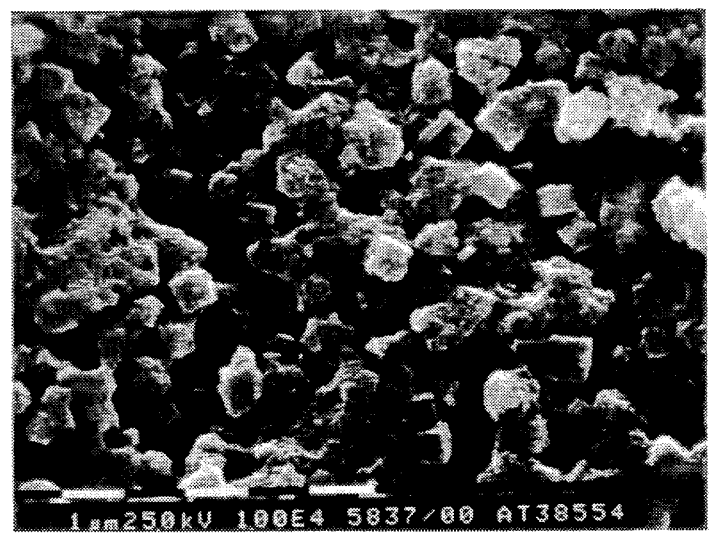
Figure 3C:

FIG. 3 shows three micrographs of the ZK-5 zeolite produced in Example 3. The magnification is 10,000 times. The micrographs show, from top to bottom, the ZK-5 matrix crystals, the silica-bound extrudate and the binder-free extrudate respectively. A comparison of the micrographs shows that the amorphous silica in the bound extrudate is not present in the binder-free extrudate, but has been replaced by newly formed intergrown ZK-5 crystals.

I claim:

1. A process for producing a zeolite containing less than 10 percent by weight silica binder, comprising aging at elevated temperature a silica-bound zeolite aggregate in an aqueous ionic solution which contains hydroxy ions such that the initial molar ratio of OH–:SiO$_2$ is in the range of 0.1 up to 1.2 and which causes the silica binder to be converted to zeolite of the type initially bound or a type which is a crystallographic match for the zeolite initially bound, said silica-bound zeolite selected from the group consisting of MFI, KFI, Y, Beta, Omega, Chabasite, T, Offretite, ZSM-22, ZSM-23, titanosilicate, ZSM-34 and ZSM-12 type zeolites.

2. The process according to claim 1 wherein the OH–:SiO$_2$ molar ratio is in the range of 0.3 to 0.6.

3. The process according to claim 1 wherein said aging is conducted at a temperature in the range of from 95° C. to 200° C.

4. The process according to claim 1, which further comprises aging a silica-bound aggregate of:
   (a) a KFI-type zeolite which contains a strontium source in the presence of a solution containing a source of potassium aluminate; or
   (b) an MFI-type zeolite in the presence of a solution containing a positive tetrapropylammonium (TPA) species and a NA$^+$source.

5. The process according to claim 4 wherein the aging is carried out at 145° to 155° C.

6. The process according to claim 5, wherein the aging is carried out for 60 to 140 hours.

7. The process according to claim 4, wherein the KFI-type zeolite is a ZK-5 zeolite.

8. The process according to claim 7, wherein the ZK-5 zeolite is aged for 110 to 130 hours.

9. The process according to claim 4 wherein said zeolite is an MFI type zeolite.

10. The process according to claim 9, wherein the MFI-type zeolite is ZSM-5.

11. The process according to claim 9, wherein the MFI-type zeolite is a silicalite.

12. The process according to claim 1 wherein said zeolite is a Y type zeolite.

13. The process according to claim 12, which comprises aging a silica-bound aggregate of a Y-type zeolite in the presence of a solution containing sodium aluminate.

14. The process according to claim 13, wherein the aging is carried out at 95° C. to 110° C.

15. The process according to claim 14, wherein the aging is carried out for 18 to 28 hours.

16. The process according to claim 15, wherein the aged zeolite is washed and dried.

17. The process according to claim 1, wherein the aggregate particles have a hexane adsorption of at least 9 wt % at 30° C. and p/po=0.25.

18. The process according to claim 1 wherein said silica contains no more than 2,000 ppm of alumina.

19. The process according to claim 1 wherein said binder-free zeolite contains less than 3% by weight of unconverted binder.

20. The process according to claim 1 wherein said silica binder is converted into zeolite crystals of sub-micron size.

21. A binder-free zeolite prepared by the process of claim 1.

22. A process for producing a zeolite containing less than 10 percent by weight silica binder, comprising aging at elevated temperature a silica-bound MFI type zeolite aggregate in an aqueous ionic solution containing hydroxy ions such that the initial molar ratio of OH−:SiO$_2$ is up to 1.2 and which causes the silica binder to be converted to zeolite MFI or a crystallographic match for zeolite MFI.

23. The process according to claim 22 wherein said aqueous ionic solution contains a source of tetrapropylammonium ions.

24. The process according to claim 23 wherein said source of OH− ions is sodium hydroxide and wherein said solution is free of added alumina.

25. The process according to claim 22 wherein said aging is conducted at a temperature in the range of 130° C. to 170° C. for a period of from 60 to 140 hours.

26. The process according to claim 25 wherein said aging is conducted at a temperature in the range of 145° C. to 155° C. for a period of from 70 to 80 hours.

27. The process according to claim 23 wherein said aged zeolite is further washed and calcined.

28. The process according to claim 27 wherein said calcination is conducted at a temperature in the range of 450° C. to 550° C.

29. The process according to claim 22 wherein said MFI type zeolite is selected from the group consisting of silicalite and ZSM-5.

30. The process according to claim 29 wherein said MFI type zeolite is ZSM-5.

31. The process according to claim 22 wherein the OH−:SiO$_2$ molar ratio is up to 0.6.

32. The process according to claim 31, wherein the MFI-type zeolite is aged for 70 to 80 hours.

33. The process according to claim 32, wherein the aged MFI-type zeolite is calcined after washing.

34. The process according to claim 33, wherein the calcination is carried out at 450° to 550° C.

35. The process according to claim 22 wherein said binder-free zeolite contains less than 3% by weight of unconverted binder.

36. A binder-free zeolite prepared by the process of claim 22.

* * * * *